United States Patent
Eguchi et al.

(10) Patent No.: US 7,640,389 B2
(45) Date of Patent: Dec. 29, 2009

(54) NON-VOLATILE MEMORY HAVING A MULTIPLE BLOCK ERASE MODE AND METHOD THEREFOR

(75) Inventors: Richard K. Eguchi, Austin, TX (US); Jon S. Choy, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 518 days.

(21) Appl. No.: 11/364,129

(22) Filed: Feb. 28, 2006

(65) Prior Publication Data

US 2007/0204098 A1 Aug. 30, 2007

(51) Int. Cl.
  G06F 12/00 (2006.01)
  G06F 13/28 (2006.01)
  G06F 13/00 (2006.01)
(52) U.S. Cl. ............... 711/103; 711/154; 711/150; 365/218; 365/185.29; 365/185.3
(58) Field of Classification Search ............... 711/103
  See application file for complete search history.

(56) References Cited

U.S. PATENT DOCUMENTS

| | | | |
|---|---|---|---|
| 4,758,988 A | 7/1988 | Kuo | |
| 5,568,439 A | 10/1996 | Harari | |
| 5,636,162 A * | 6/1997 | Coffman et al. | 365/185.22 |
| 6,646,927 B2 | 11/2003 | Keays | |
| 6,662,263 B1 * | 12/2003 | Wong | 711/103 |
| 7,127,550 B1 * | 10/2006 | Lin | 711/103 |
| 2006/0203546 A1 * | 9/2006 | Lasser | 365/185.09 |

OTHER PUBLICATIONS

Ishizumi et al; "A Design of Flash Memory File System for Embedded Systems"; Systems and Computers in Japan, vol. 35, Issue 1, Wiley Periodicals, Inc., Dec. 16, 2003.
International Search Report for coordinating PCT Application No. PCT/US07/60844, mailed Sep. 29, 2008.

* cited by examiner

*Primary Examiner*—Christian P Chace
*Assistant Examiner*—Prasith Thammavong
(74) *Attorney, Agent, or Firm*—Daniel D. Hill; James L. Clingan, Jr.

(57) ABSTRACT

A non-volatile memory can have multiple blocks erased in parallel for a relatively few number of erase operations. This saves time for the user in the set-up of the memory because the erase operation is relatively slow. Problems with parallel erase relate to different blocks having different program/erase histories with the result that the blocks with different histories erase differently. Thus, after a predetermined number of erase cycles are performed, the ability to parallel erase is prevented. This is achieved by allowing parallel erasing operations until the predetermined number of erase operations have been counted. After that predetermined number has been reached, a parallel erase mode disable signal is generated to prevent further parallel erase cycles. The count and the predetermined number are maintained in a small block of the non-volatile memory that is inaccessible to the user.

20 Claims, 2 Drawing Sheets

NON-VOLATILE MEMORY HAVING A MULTIPLE BLOCK ERASE MODE AND METHOD THEREFOR

FIELD OF THE INVENTION

This invention relates generally to integrated circuit memories and more specifically to a non-volatile memory having a multiple block erase mode.

BACKGROUND

A flash memory cell is a type of non-volatile memory (NVM) cell that stores charge on a floating gate. The amount of charge on the floating gate determines a threshold voltage (VT) of the cell, hence the logic state stored by the cell. Each time the cell is programmed or erased; electrons are moved to or from the floating gate. The floating gate is electrically isolated so that charge is stored indefinitely. However, after a number of program and erase cycles, the floating gate begins to lose its ability to store charge. The cells of a flash memory array do not generally have the same life expectancy with respect to the number of program and erase operations they can endure. Flash memory cells are typically grouped together in blocks of cells, and a flash memory array is erased by erasing an entire group, or block, of memory cells at the same time. With increasing program and erase cycles, the overall $V_T$ distribution of the cells in the block tends to broaden. Also, the erase rate may change. The blocks are not usually subjected to the same number of program and erase operations so the $V_T$ distributions of the blocks widen at different rates. Consequently, the amount of time required to erase a block increases because more time is required to converge the $V_T$ distribution to within a desired $V_T$ range. The result is inconsistent erase times for different memory cell blocks of the flash memory.

Therefore, it is desirable to provide a flash memory array that provides reliable erase operations even when as the number of program and erase cycles increase and are inconsistent between blocks.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates identical items unless otherwise noted.

DETAILED DESCRIPTION

Generally, the present invention provides, in one embodiment, a flash memory having a parallel erase mode (PEM) and a normal erase mode. In the normal erase mode, only one block of memory cells is erased or multiple blocks of memory cells are erased one at a time, or serially, during an erase operation. The PEM operating mode allows more than one block to be erased at the same time. After each erase operation, a count value is incremented and stored in non-volatile memory. After a predetermined number of erase operations, the PEM is disabled and only the normal erase mode is available for erasing the memory.

Limiting the PEM to a maximum number of erase operations prevents the PEM from being entered when the $V_T$ distributions of the various memory blocks are such that a PEM erase operation will likely be unreliable. In addition, limiting the number of PEM operations prevents overstressing related circuits, such as for example, charge recovery circuits. Transistors may be overstressed and damaged if it is required to simultaneously discharge accumulated charge in the multiple array block parasitics during erase due to the high voltage required for erase.

The following sets forth a detailed description of a mode for carrying out the invention. The description is intended to be illustrative of the invention and should not be taken to be limiting.

Figure 1:
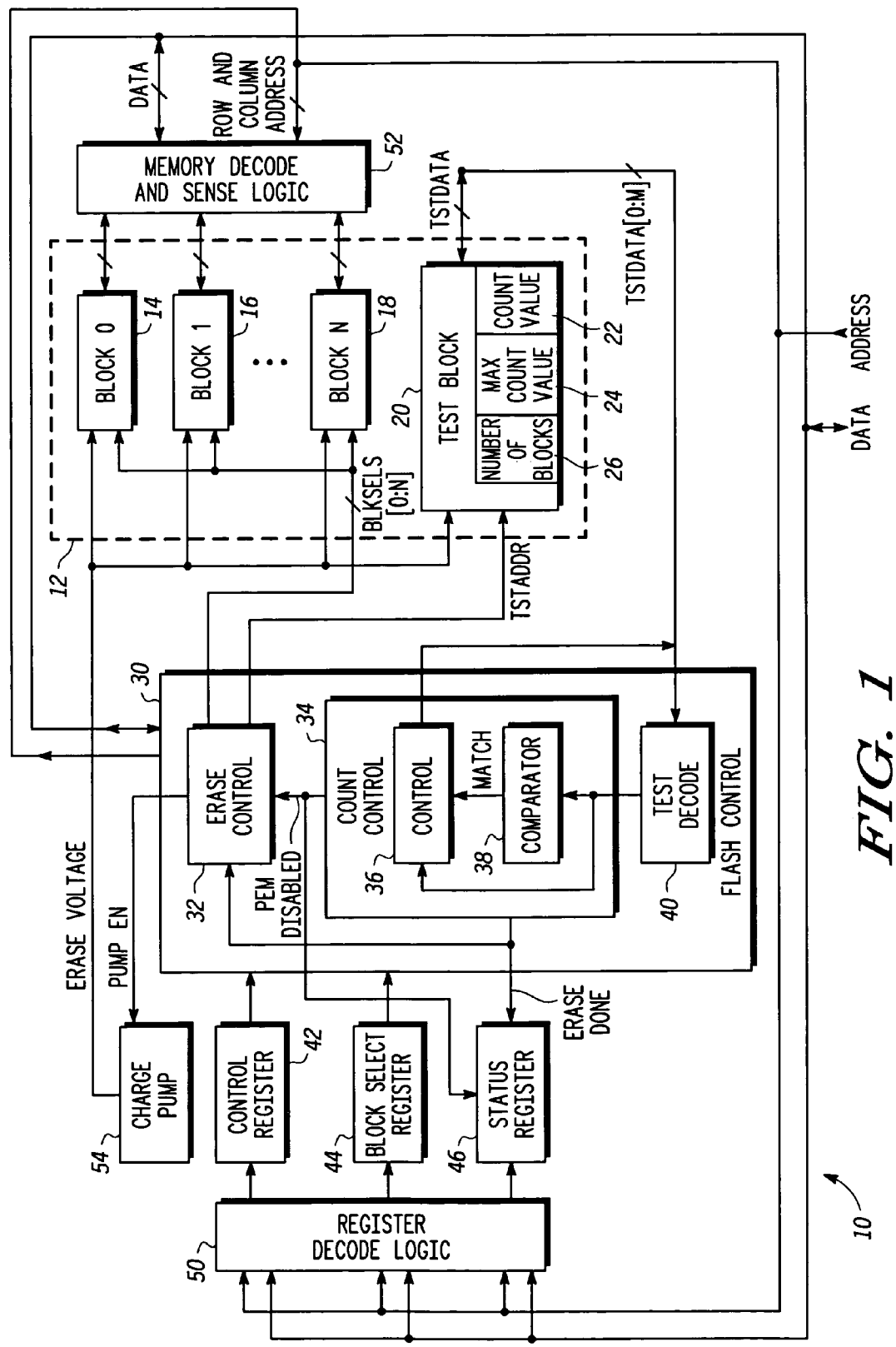
FIG. 1 illustrates, in block diagram form, a flash memory in accordance with an embodiment of the present invention.

FIG. 1 illustrates, in block diagram form, a flash memory 10 in accordance with an embodiment of the present invention. In FIG. 1, for the purposes of clarity and simplicity, only the circuits necessary for illustrating an erase operation of memory 10 are illustrated. Flash memory 10 includes an array of flash memory cells 12, a flash controller 30, registers 42, 44, and 46, register decode logic 50, memory decode and sense logic 52, and charge pump 54. The array of flash memory cells 12 includes memory blocks 14, 16, 18, and a test block 20. The test block 20 includes addressable locations 22, 24, and 26. The flash controller 30 includes erase controller 32, count controller 34, and test data decode 40.

Each of blocks 14, 16, 18, and 20 includes a plurality of flash memory cells. The flash memory cells are arranged in a matrix having word lines and bit lines. A memory cell is connected at the intersections of the word lines and the bit lines, and includes a control gate connected to the word line, a drain terminal connected to the bit line, and a source terminal connected to the source terminals of all the other memory cells within a block. The memory cell has a charge storage region. The charge storage region is electrically isolated and is known as a floating gate in some embodiments. The charge storage region may be made from polysilicon, or may comprise other charge storage materials, such as for example, nanocrystals or nitride. In the illustrated embodiment, the memory 10 is embedded on an integrated circuit with other circuit components such as for example, a microprocessor core. In other embodiments, the memory 10 may be implemented as a "stand-alone" memory integrated circuit.

One common technique used to prevent over-erasure of flash memory cells comprises first programming all of the cells. Then, the cells are gradually erased in steps using an erase pulse of relatively short duration. After the application of each erase pulse, a verification step is used to check the $V_T$ to determine if the $V_T$ has been sufficiently reduced. The erase and verify steps are repeated until none of the cells register a programmed response to the verification step. In other embodiments, other erase techniques may be used.

Memory 10 has a plurality of input terminals for receiving a plurality of address signals labeled "ADDRESS". The address includes, for example, row address signals, column address signals, and block select signals. The memory decode and sense logic 52 has a plurality of input terminals for receiving the row and column address signals during read and program operations of memory 10. The memory decode and sense logic 52 is also coupled to the flash control 30 for receiving row and column address signals during erase operations. Generally, the memory decode and sense logic 52 includes input and output circuitry such as sense amplifiers, row and column decoders, and the like. Data signals, labeled "DATA" are transmitted by or to each of the memory decode and sense logic 52, flash control 30, and the register decode logic 50. A processor (not shown) may be coupled to provide and/or receive the data signal DATA and to provide the address signals ADDRESS. The processor may be implemented on the same integrated circuit as the memory 10 or may be on a separate integrated circuit.

The memory blocks 14, 16, and 18 are bi-directionally coupled between the memory decode and sense logic 52 for sending and receiving data in response to receiving row and column address information. In the illustrated embodiment, read and program operations of the flash memory 10 are conventional and will not be described in detail. Also, note that not all of the circuitry necessary for reading and programming memory 10 is illustrated in FIG. 1 for the purpose of simplicity and clarity. During a normal access for either a read operation or a program operation, the memory blocks 14, 16, and 18 receive address information to select memory cells within one or more of the blocks 14, 16, and 18. Data is provided by the selected memory cells during a read operation and received by the selected memory cells during a write operation.

Erase operations are controlled by circuitry within flash control 30. Erase control 32 has an output for providing a test address signal labeled "TSTADDR" to the test block 20, an output for providing a charge pump enable signal labeled "PUMP EN" to charge pump 54, and a plurality of outputs for providing a plurality of block select signals "BLKSELS[0:N]" to each of the blocks 14, 16, and 18. The charge pump is used to generate a voltage for program operations, erase operations, or both program and erase operations. In one embodiment, the block select signals BLKSELS[0:N] are a portion of the address signals ADDRESS and are for selecting which of memory blocks 14, 16, or 18 are accessed. Also, in one embodiment, erase control 32 generates the block select signals BLKSELS[0:N] for an erase operation. Data signals DATA and row and column addresses are coupled to erase control 32, which can be used throughout the normal erase mode operation to intelligently determine which bits require additional high voltage pulses as discussed above.

The memory block 20, labeled "TEST BLOCK" functions essentially the same as the memory blocks 14, 16, and 18 except that memory 20 is hidden and is not accessible by a user. Also, memory block 20 is separately addressable from memory blocks 14, 16, and 18 and is accessed with address signals "TSTADDR" from flash control 30. Data is provided to and from test block 20 via conductors labeled "TSTDATA". The memory block 20 is for storing testing information, lot numbers, identification numbers, redundancy mapping, trim options, and other information useful for a manufacturer of memory 10. In addition, the block 20 includes a location 22 for storing data labeled "COUNT VALUE", a location 24 for storing data labeled "MAXIMUM COUNT VALUE" and a location 26 for storing data labeled "NUMBER OF BLOCKS". Each of the locations 22, 24, and 26 include one or more memory cells of test block 20. The memory block 20 is bi-directionally coupled to the test decoder circuit 40 of the flash control 30.

Flash memory erase operations generally require a significant amount of time to complete, especially if the memory array is very large. The parallel erase mode allows erase operations to be completed much more quickly by allowing more than one of the blocks to be erased at the same time. Using the PEM, multiple memory blocks may be erased in about the same amount of time required to erase one block. The parallel erase mode may be used during, for example, production testing to reduce cycle time and cost. To prevent damage to the memory, the number of parallel erase operations is limited to a predetermined number. The predetermined number of PEM operations is programmed into location 24 of test block 20. When the predetermined number is reached, the PEM is disabled. Further erase operations must be accomplished using the normal erase mode. Note that in the illustrated embodiment, the maximum count value and the count value are stored in a flash memory block that is not accessible by a user of memory 10. In other embodiments, these values may be stored in another memory type, register file, or the like.

In the flash controller 30, test data TSTDATA[0:M] is provided to a data input of the test decode circuit 40, the test decode circuit 40 is coupled to comparator 38 and to control 36 of count control 34. Count control 34 also provides a signal labeled "ERASE DONE" to the status register 46 to indicate when an erase operation is complete. The comparator 38 is coupled to control 36 for providing a match signal labeled "MATCH" when the count value in location 22 is equal to, or within a threshold value of the maximum count value stored in location 24. The controller 36 is also coupled to the data input of the test decode circuit 40. The count control circuit 34 provides a signal labeled "PEM DISABLED" to an input of the status register 46 and to an input of erase control 32 when the comparator 38 detects a match. The register and decode logic 50 has a first output coupled to an input of control register 42, a second output coupled to an input of block select register 44, and a third output coupled to an input of status register 46. Control register 42 and block select register 44 each have an output coupled to flash controller 30.

Figure 2:
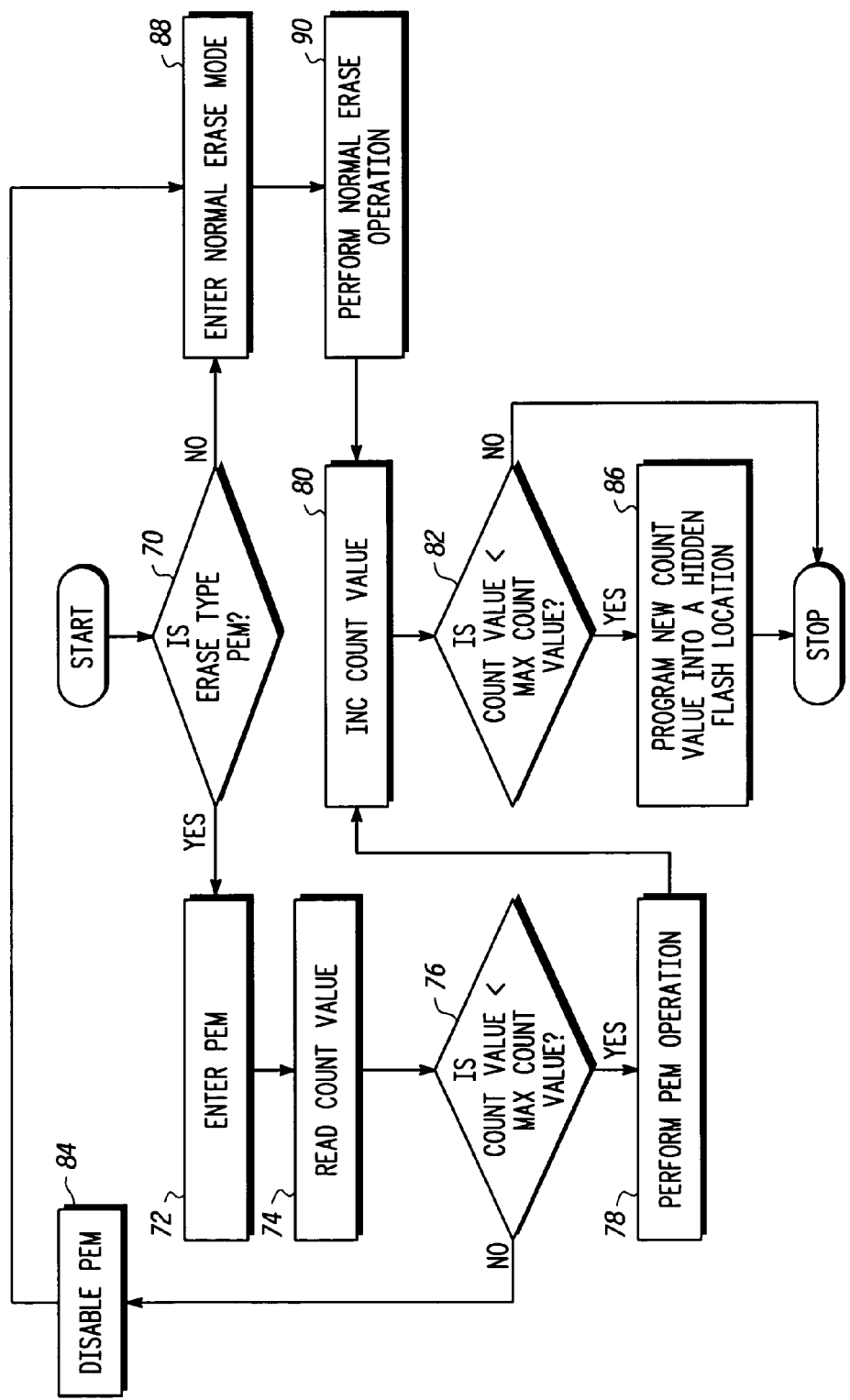
FIG. 2 is a flow chart illustrating a method for operating the flash memory of FIG. 1.

FIG. 2 is a flow chart illustrating a method for operating the memory 10 of FIG. 1. The operation of the memory 10 will be discussed by referring to both FIG. 1 and FIG. 2. The method of FIG. 2 begins at decision step 70. At decision step 70, an erase operation of memory 10 is begun and it is determined if the erase mode is either PEM or normal erase mode. The erase mode being used is determinable by reading status register 46 to see if the PEM disabled bit is active along with a selection of the PEM mode in the control register 42. The PEM disabled register is initially loaded when resetting memory 10. Also, the flash control block 30 interrogates the information stored in the test block 20 in locations 22, 24, and 26 to determine if the count value 22 has exceeded the maximum count value 24. During normal mode, the memory 10 is erased one block at a time. During PEM, more than one block of the memory 10 is erased substantially simultaneously. To enter normal mode, a predetermined bit field of the control register 42 is written to. If at step 70 it is determined that the erase type is PEM, the YES path is taken to step 72 where PEM is entered. If the erase type is not PEM, then the NO path is taken to step 88 and a normal erase mode is entered.

Returning to step 72, to enter PEM, a predetermined bit field is written to, and in addition, a predetermined bit field of the status register 46 is read from to confirm that the memory 10 is available for an erase operation. At step 74, the erase controller 32 provides a test address TSTADDR to read locations 22, 24, and 26 of block 20. The data stored in locations 22, 24, and 26 are provided to test decode 40.

At decision step 76, it is determined if the number of erase operations is less than the maximum number of erase operations stored in location 24. The data stored at locations 22, 24, and 26 is provided to the comparator 38 and to the control circuit 36. The comparator 38 compares the maximum count value to the current count value, and if the current count value is less than the maximum count value, a logic low MATCH signal is provided to control 36, the PEM operation is allowed and the YES path is taken to step 78 where a PEM operation is performed. During the PEM operation, the block select register 44, along with the maximum number of blocks stored at location 26 are used to determine how many block select signal BLKSELS[0:N] are enabled simultaneously. The maximum number of blocks that can be subjected to a PEM may be determined by, for example, the maximum current the charge pump is capable of producing. If the maximum number of blocks stored at location 26 is exceeded by the number of blocks selected, then memory 20 may, in one embodiment, erase up to the maximum number in one PEM and either request an additional PEM for the rest, or erase the rest serially. Erase control 32 provides corresponding block select signals BLKSEL[0:N] to each of the blocks to be erased. The pump enable signal PUMPEN is provided to enable charge pump 54 to provide an elevated erase voltage to the selected blocks. The number of blocks that can be erased in parallel is determined in part by the capability of the charge pump 54. The maximum number of blocks for a PEM operation is stored at location 26. The selected blocks are then erased using a known erase or erase/verify operation, such as a Fowler-Nordheim tunnel erase method. The specific type of erase operation is not important for describing the present invention and may be different in other embodiments. When the erase operation is complete, an erase done signal "ERASE DONE" is provided the erase control 32 and to the status register 46. If at step 76 it is determined that the count value is equal to or greater than the maximum count value stored at location 24, then the NO path is taken to step 84 and the PEM is disabled by asserting the signal "PEM DISABLE" from count controller 34 to erase controller 32 and to status register 46.

At step 80, the incremented erase count value is programmed at location 22.

At decision step 82, it is determined if the erase cycle, or value stored at location 22 is less than the maximum count value stored at location 24. If the erase count value stored at location 22 is less than the maximum count value, then the YES path is taken to step 86 and the new or incremented count value is stored at location 22. If at decision step 82, it is determined that the erase count value stored at location 22 is equal to or greater than the maximum count value stored at location 24, then the NO path is taken and the method ends.

The normal erase mode is entered either from decision step 70 or step 84. At step 90, the normal erase mode operation is performed on a selected number of blocks from one to N. As stated above for the PEM, the specific type of erase operation performed at step 90 is not important for describing the present invention and may be different in other embodiments. After step 90, steps 80, 82, and 86 are performed as described above.

By limiting the PEM to a maximum number of erase operations, a potentially unreliable erase operation is prevented. Also, limiting the number of PEM operations prevents overstressing related circuits, such as for example, charge recovery circuits.

While the invention has been described in the context of a preferred embodiment, it will be apparent to those skilled in the art that the present invention may be modified in numerous ways and may assume many embodiments other than that specifically set out and described above. For example, the conductivity types of the transistors may be reversed. Accordingly, it is intended by the appended claims to cover all modifications of the invention which fall within the true scope of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   providing a memory comprising a predetermined number of blocks;
   enabling a parallel erase operating mode of the predetermined number of blocks;
   reading a count value from a counter;
   determining that the count value is less than a maximum count value;
   erasing two or more blocks of the predetermined number of blocks in parallel when in the parallel erase operating mode;
   incrementing the count value to produce an incremented count value when the two or more blocks are erased; and
   determining that the incremented count value is greater than or equal to the maximum count value and in response, disabling the parallel erase operating mode so that all subsequent erase operations of the predetermined number of blocks occur in series.

2. The method of claim 1, wherein providing a memory further comprises providing a flash memory.

3. The method of claim 1, wherein counting each occurrence of erasing produces a count value that is stored in a first predetermined location, and wherein a maximum count value is stored in a second predetermined location.

4. The method of claim 3, wherein disabling the parallel erase operating mode further comprises enabling a normal erase operating mode, the normal erase operating mode comprising at least one of a group consisting of erasing only one block and erasing a plurality of blocks in series.

5. The method of claim 1, wherein each step of erasing comprises:
   applying a first plurality of pulses to the two or more blocks;
   detecting if the erasing was unsuccessful; and
   applying a second plurality of pulses to the two or more blocks if the step of detecting determines that the erasing was unsuccessful.

6. The method of claim 1, further comprising a normal erase operating mode comprising:
   erasing only one block; and
   erasing a plurality of blocks in series.

7. The method of claim 1, further comprising generating an erase complete signal upon completion of an erasing operation.

8. The method of claim 7, wherein the step of counting is further characterized as counting occurrences of the erase complete signal.

9. The method of claim 1, wherein the step of counting is further characterized as storing the count value in a portion of the memory that is non-volatile and inaccessible to a user of the memory.

10. A circuit, comprising:
    a non-volatile memory having a plurality of blocks, wherein the non-volatile memory has erase modes comprising:
       erasing a plurality of blocks in parallel;
       erasing only one block; and
       erasing a plurality of blocks in series; and a memory control circuit coupled to the non-volatile memory comprising a count control circuit and an erase control circuit, wherein:

the count control circuit maintains a count of a number of performances of the erase modes; and the erase control circuit enables the mode of erasing a plurality of blocks in parallel when the count is below a predetermined number and the erase mode of erasing a plurality of blocks in parallel has been selected, and when the count is equal to or greater than the predetermined number and the erase mode of erasing a plurality of blocks in parallel has been selected, the erase control circuit disables the mode of erasing a plurality of blocks in parallel and causes the plurality of blocks to be erased in series.

11. The circuit of claim 10, further comprising a voltage generator coupled to the memory and the memory control circuit.

12. The circuit of claim 11 wherein the voltage generator provides an erase voltage and wherein the mode of erasing a plurality of blocks in parallel comprises:

simultaneously applying a first plurality of pulses of the erase voltage to the plurality of blocks;

detecting if the erasing of the plurality of blocks was unsuccessful; and applying a second plurality of pulses to the plurality of blocks if the step of detecting determines that the erasing was unsuccessful.

13. The circuit of claim 10, wherein the memory further comprises a test block, coupled to the count control circuit, where the count is stored.

14. The circuit of claim 13, wherein the count control circuit comprises a comparator that compares the count stored in the test block with the predetermined number.

15. The circuit of claim 10 further comprising a status register, wherein the count control circuit provides an erase done signal to the status register when a performance of one of the erase modes has occurred and a parallel erase mode disable signal when the count is equal to or greater than the predetermined number.

16. A method of erasing a non-volatile memory having a plurality of memory blocks, comprising:

performing a plurality of steps of erasing one or more of the blocks, wherein each step of the plurality of steps of erasing one or more of the blocks comprises performing an erase step selected from a group of erase steps consisting of:

erasing a plurality of blocks in parallel;

erasing only one block; and erasing a plurality of blocks in series;

providing a count of occurrences of performances of the erase steps;

comparing the count of occurrences to a predetermined number; and when the count is equal to or greater than the predetermined number, preventing future performances of the erase step of erasing a plurality of blocks in parallel and causing all subsequent erase steps to be performed by erasing the plurality of blocks in series.

17. The method of claim 16 wherein the erase step of erasing a plurality of blocks in parallel comprises:

simultaneously applying a first plurality of erase pulses to the plurality of blocks;

detecting if the erasing of the plurality of blocks was unsuccessful; and applying a second plurality of erase pulses to the plurality of blocks if the step of detecting determines that the erasing was unsuccessful.

18. The method of claim 17, wherein the second plurality of erase pulses has a higher voltage than the first plurality of erase pulses.

19. The method of 16 further comprising performing the erase step of erasing a plurality of blocks in series when the erase step of erasing a plurality of blocks in parallel has been selected after the count has equaled the predetermined number.

20. The method of claim 16, wherein the non-volatile memory further comprises a non-volatile test block that is inaccessible to a user of the non-volatile memory, further comprising:

storing the predetermined number in the test block;

storing the count in the test block; and storing a number for a maximum number of blocks that can be erased in parallel.

\* \* \* \* \*